United States Patent
Montojo et al.

(10) Patent No.: US 10,616,771 B2
(45) Date of Patent: *Apr. 7, 2020

(54) OPPORTUNISTIC RECLAIMING OF RESOURCES IN NEW RADIO-SPECTRUM SHARING (NR-SS)

(71) Applicant: QUALCOMM INCORPORATED, San Diego, CA (US)

(72) Inventors: Juan Montojo, San Diego, CA (US); Taesang Yoo, San Diego, CA (US); Xiaoxia Zhang, San Diego, CA (US); Aleksandar Damnjanovic, Del Mar, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,884

(22) Filed: Jun. 26, 2019

(65) Prior Publication Data

US 2019/0320323 A1    Oct. 17, 2019

Related U.S. Application Data

(63) Continuation of application No. 15/636,372, filed on Jun. 28, 2017, now Pat. No. 10,356,626.
(Continued)

(51) Int. Cl.
*H04W 16/14* (2009.01)
*H04W 24/08* (2009.01)
(Continued)

(52) U.S. Cl.
CPC .......... *H04W 16/14* (2013.01); *H04W 24/08* (2013.01); *H04W 28/26* (2013.01);
(Continued)

(58) Field of Classification Search
CPC . H04W 16/14; H04W 28/26; H04W 74/0875; H04W 24/08; H04W 72/10;
(Continued)

(56) References Cited

U.S. PATENT DOCUMENTS 10,231,131 B2 *   3/2019   Zhang ................... H04W 16/14
10,356,626 B2 *   7/2019   Montojo ............... H04W 16/14
(Continued)

OTHER PUBLICATIONS

International Search Report and Written Opinion—PCT/US2017/061052—ISA/EPO—dated Feb. 5, 2018.
(Continued)

*Primary Examiner* — Marisol Figueroa
(74) *Attorney, Agent, or Firm* — Haynes and Boone, LLP

(57) ABSTRACT

Wireless communications systems and methods related to reclaiming of resources in a shared frequency spectrum shared by multiple operators are provided. A first wireless communication device associated with a first operator of a plurality of operators identifies a transmission opportunity in a shared frequency spectrum shared by the plurality of operators, wherein the first operator has priority among the plurality of operators for accessing the shared frequency spectrum in the transmission opportunity. The first wireless communication device communicates with a second wireless communication device associated with the first operator, in the transmission opportunity without a prior reservation of the transmission opportunity.

20 Claims, 12 Drawing Sheets

Related U.S. Application Data

(60) Provisional application No. 62/430,770, filed on Dec. 6, 2016.

(51) Int. Cl.
*H04W 72/04* (2009.01)
*H04W 28/26* (2009.01)
*H04W 74/08* (2009.01)
*H04W 72/10* (2009.01)
*H04W 74/00* (2009.01)
*H04W 74/04* (2009.01)

(52) U.S. Cl.
CPC ... *H04W 74/0808* (2013.01); *H04W 74/0875* (2013.01); *H04W 72/0446* (2013.01); *H04W 72/10* (2013.01); *H04W 74/006* (2013.01); *H04W 74/04* (2013.01)

(58) Field of Classification Search
CPC ............. H04W 72/0446; H04W 74/04; H04W 74/006; H04W 74/0808
See application file for complete search history.

(56) References Cited

U.S. PATENT DOCUMENTS

| | | |
|---|---|---|
| 2007/0274280 A1 | 11/2007 | Haas et al. |
| 2012/0113952 A1 | 5/2012 | Kneckt et al. |
| 2015/0043478 A1 | 2/2015 | Mackenzie et al. |
| 2015/0092758 A1 | 4/2015 | Chen et al. |
| 2016/0142994 A1 | 5/2016 | Luo et al. |
| 2016/0212625 A1 | 7/2016 | Damnjanovic et al. |
| 2018/0160313 A1 | 6/2018 | Montojo et al. |

OTHER PUBLICATIONS

Irnich T., et al., "Spectrum Sharing Scenarios and Resulting Technical Requirements for 5G Systems", 2013 IEEE 24th International Symposium on Personal, Indoor and Mobile Radio Communications (PIMRC Workshops), IEEE, Sep. 8, 2013 (Sep. 8, 2013), pp. 127-132, XP032544982, DOI: 10.1109/PIMRCW.2013.6707850, [retrieved on Jan. 8, 2014].

\* cited by examiner

OPPORTUNISTIC RECLAIMING OF RESOURCES IN NEW RADIO-SPECTRUM SHARING (NR-SS)

CROSS REFERENCE TO RELATED APPLICATIONS

The present application is a continuation of U.S. Non-Provisional patent application Ser. No. 15/636,372 filed Jun. 28, 2017, which claims priority to and the benefit of U.S. Provisional Patent Application No. 62/430,770, filed Dec. 6, 2016, the disclosure of each of which is hereby incorporated by reference in its entirety.

TECHNICAL FIELD

This application relates to wireless communication systems, and more particularly to reclaiming of resources in a shared frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing (SS). In a priority-based coordinated access scheme, a shared spectrum is partitioned into multiple time slots. Each time slot is designated for a particular type of access. For example, a time slot can be allocated to a particular network operator for exclusive access of the shared spectrum, where no reservation from the particular network operator is required. Alternatively, a time slot can be shared among multiple network operators on a priority basis with reservations. For example, a high priority network operator may have priority or guaranteed access of the shared spectrum in a time slot, but requires a prior reservation of the time slot. When the high priority network operator does not reserve the time slot, a low priority network operator can opportunistically access the shared spectrum in the time slot. One drawback of the priority-based coordinated access scheme is that a network operator is not allowed to use the shared spectrum without a prior reservation even when the shared spectrum is available (e.g., not reserved by any network operator). Accordingly, improved procedures for allocating and using a shared spectrum among network operators are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes identifying, by a first wireless communication device associated with a first operator of a plurality of operators, a transmission opportunity in a shared frequency spectrum shared by the plurality of operators, wherein the first operator has priority among the plurality of operators for accessing the shared frequency spectrum in the transmission opportunity; and communicating, by the first wireless communication device, with a second wireless communication device associated with the first operator, in the transmission opportunity without a prior reservation of the transmission opportunity.

In an additional aspect of the disclosure, an apparatus includes a processor configured to identify a transmission opportunity in a shared frequency spectrum shared by a plurality of operators, wherein the apparatus is associated with a first operator of a plurality of operators, and wherein the first operator has priority among the plurality of operators for accessing the shared frequency spectrum in the transmission opportunity; and a transceiver configured to communicate with a second wireless communication device associated with the first operator, in the transmission opportunity without a prior reservation of the transmission opportunity.

In an additional aspect of the disclosure, a computer-readable medium having program code recorded thereon, the program code includes code for causing a first wireless communication device associated with a first operator of a plurality of operators to identify a transmission opportunity in a shared frequency spectrum shared by the plurality of operators, wherein the first operator has priority among the plurality of operators for accessing the shared frequency spectrum in the transmission opportunity; and code for causing the first wireless communication device to communicate with a second wireless communication device associated with the first operator, in the transmission opportunity without a prior reservation of the transmission opportunity.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
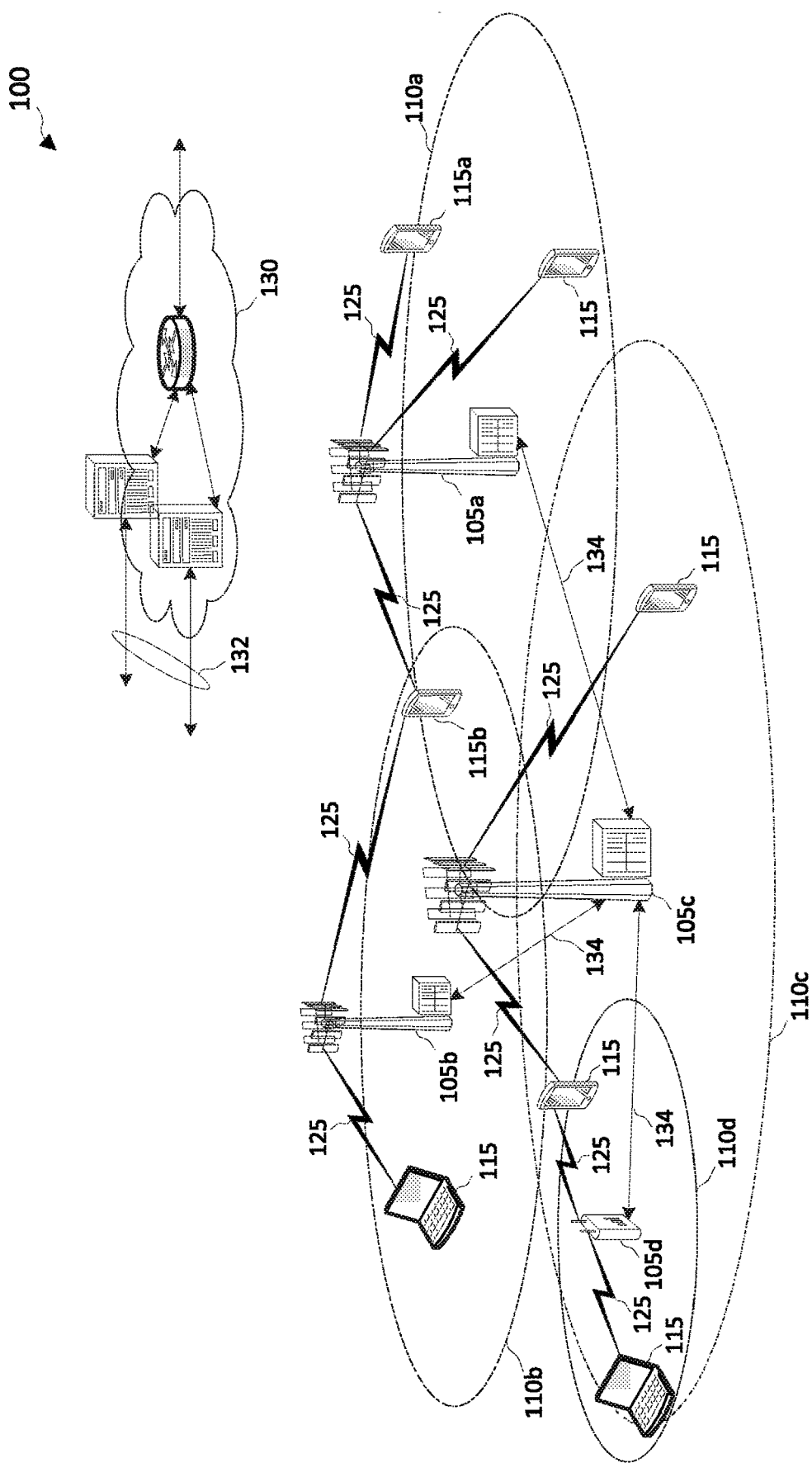
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWav bands) network.

The present disclosure describes opportunistic resource reclaiming mechanisms in a priority-based coordinated SS scheme. In a priority-based coordinated SS scheme, a shared spectrum is time-partitioned into intervals including exclusive access intervals and transmission opportunity (TXOP) intervals. Each exclusive access interval is designated for exclusive use by a particular network operator. A TXOP interval is designated for prioritized use by a prioritized (e.g., high priority) network operating entity and opportunistic use by low network operating entities based on reservations. The disclosed embodiments allow a prioritized network operating entity to opportunistically reclaim resources (e.g., the shared spectrum in the prioritized TXOP interval) for communications without a prior reservation. In addition, when the high priority network operating entity uses only a portion of the TXOP interval for communication, the disclosed embodiments allow a low priority network operating entity to opportunistically reclaim the remaining portion of the TXOP interval for communication. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit a channel state information—reference signal (CSI-RS) to enable a UE 115 to estimate a DL channel. Similarly, a UE 115 may transmit a sounding reference signal (SRS) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL centric or UL centric. A DL centric subframe may include a longer duration for DL communication than UL communication. A UL centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time intervals and may avail themselves of an entirety of a designated shared spectrum. In addition, certain time intervals may be allocated for certain types of communication or access over the shared spectrum. Further, by allowing certain network operating entities to reclaim certain available resources (e.g., time) may further improve coordinated access performance, as described in greater detail herein.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
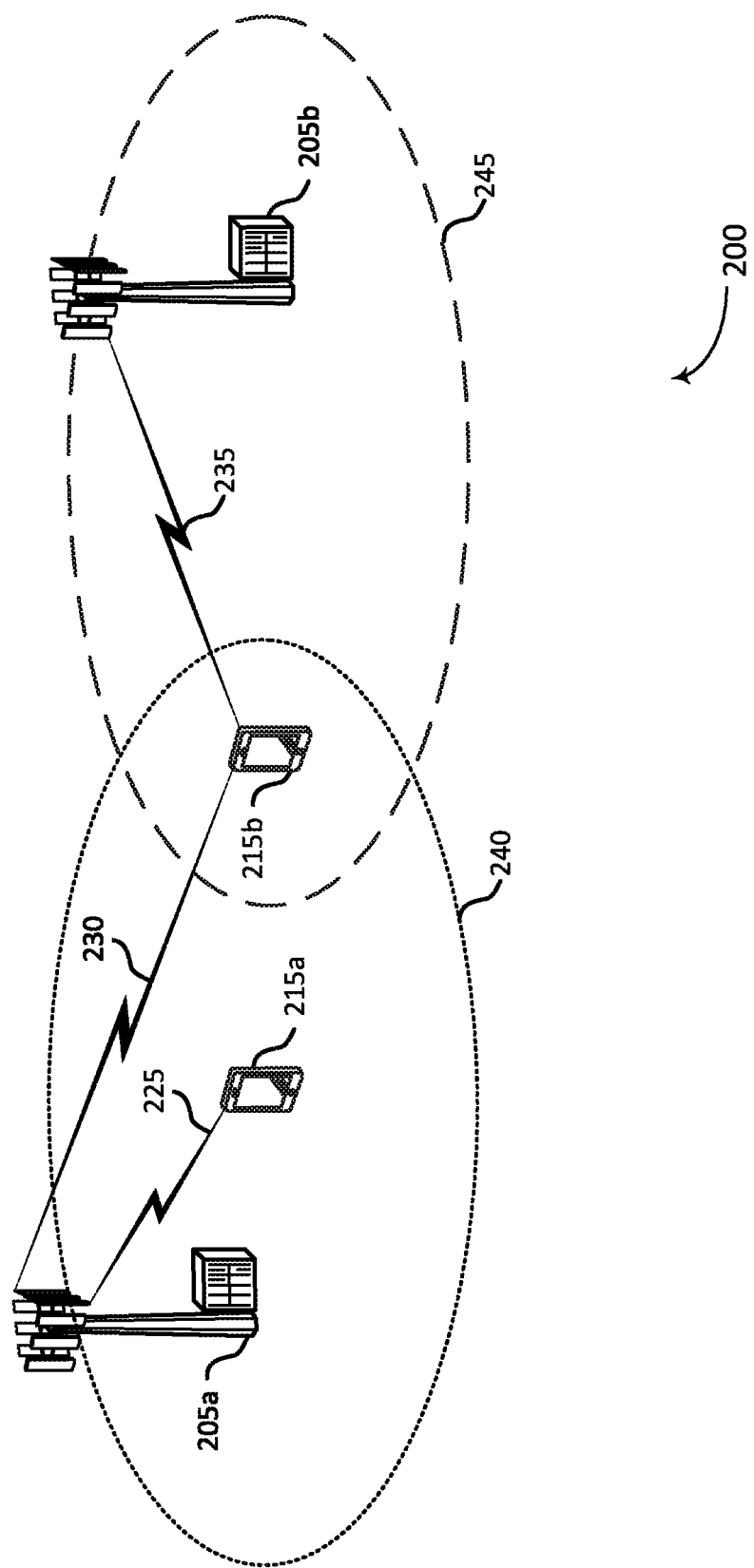
FIG. 2 illustrates an example of a wireless communications network that supports coordinated spectrum sharing (SS) according to embodiments of the present disclosure.

FIG. 2 illustrates an example of a wireless communications network 200 that supports coordinated SS according to embodiments of the present disclosure. The network 200 corresponds to a portion of the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 are similar to the BSs 105. The UEs 215 are similar to the UEs 115. The BS 205a and BS 205b may communicate with the UEs 215 or other wireless devices within their respective coverage areas 240 and 245. The UEs 215 and the BS 205 may communicate with each other over a shared spectrum.

In the network 200, the BS 205a may be operated by one or more network operating entities. For example, the BS 205a may be operated by a first network operating entity to communicate with the UE 215a via a communication link 225, and the BS 205a may be operated by a second network operating entity to communicate with the UE 215b via a communication link 230. Similarly, the BS 205b may also be operated by one or more network operating entities. In some embodiments, the BS 205b is operated by a third network operating entity to communicate with the UE 215b via communication link 235. In this embodiment, the UE 215b may be configured to operate with both the second and third network operating entities.

The shared spectrum may be efficiently used by employing a coordinated resource partitioning scheme and an opportunistic resource reclaiming scheme between the multiple network operating entities. For example, the shared spectrum may be partitioned by classifying time resources into intervals and assigning the intervals to different network operating entities. In some embodiments, certain time intervals may be allocated for exclusive use by a particular network operating entity. Other time intervals may be allocated for prioritized use by a particular network operating entity, but may also be for opportunistic use by the other network operating entities. In yet other examples, certain time intervals may be designated for opportunistic use by all network operating entities. In some embodiments, certain network operating entities are allowed to opportunistically reclaim unused resources to improve bandwidth utilization efficiency, as described in greater detail herein.

Figure 3:
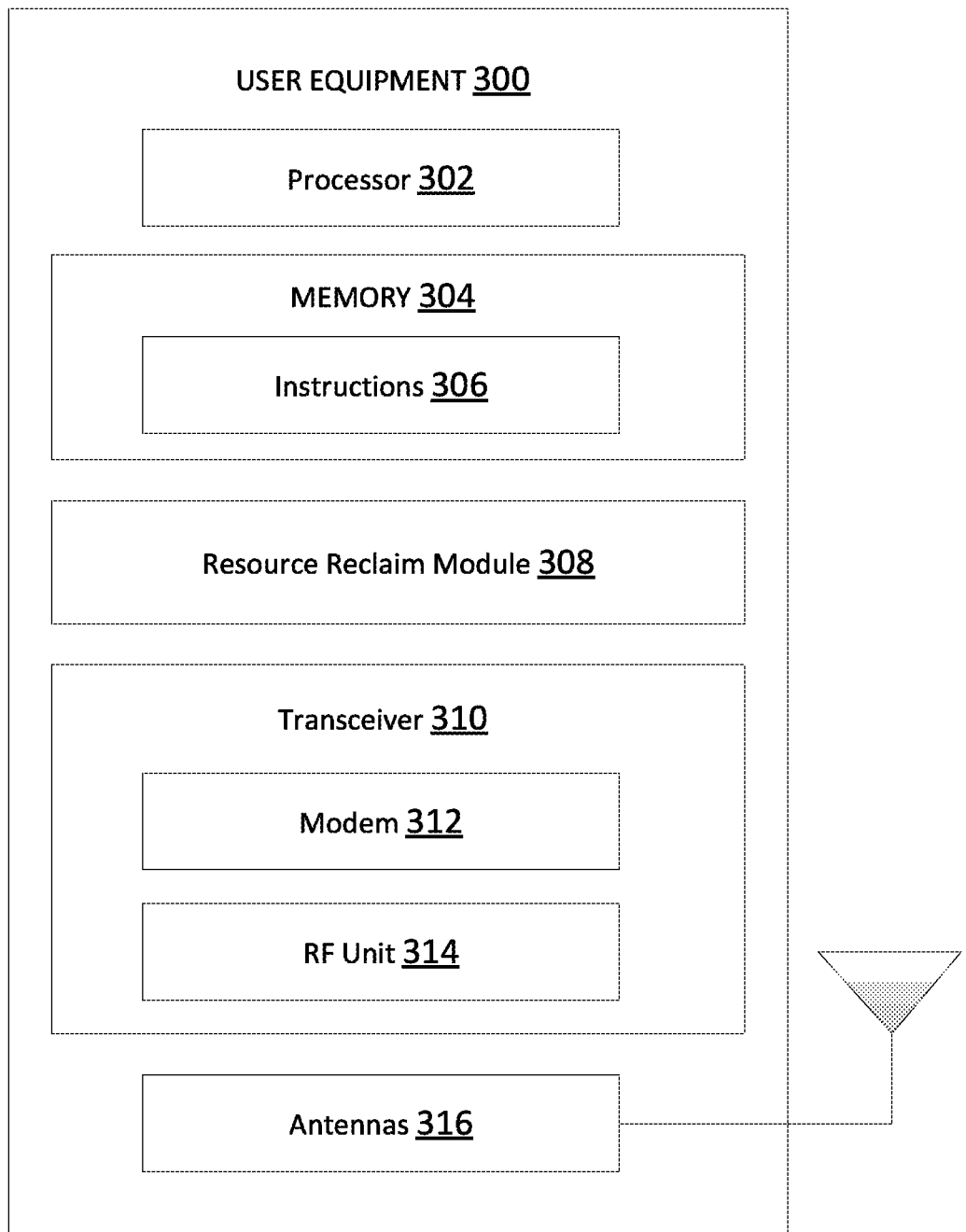
FIG. 3 is a block diagram of an exemplary user equipment (UE) according to embodiments of the present disclosure.

Access to the network 200, the portioning and allocation of the resources, and/or the synchronization of the network operating entities may be controlled by a central coordinator (e.g., SAS). In some embodiments, the partition and classification of resources may be autonomously determined based on the number of network operating entities. Synchronization between the network operating entities may occur explicitly through centralized signaling. Additionally or alternatively, the entities may employ a self-synchronization scheme based on "network-listening" where the wireless nodes (e.g., the BSs 205) from different network operating entities listen to each other and determine a timing synchronization accordingly FIG. 3 is a block diagram of an exemplary UE 300 according to embodiments of the present disclosure. The UE 300 may be a UE 115 or 215 as discussed above. As shown, the UE 300 may include a processor 302, a memory 304, a resource reclaim module 308, a transceiver 310 including a modem subsystem 312 and a radio frequency (RF) unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 215 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The resource reclaim module 308 may be used for various aspects of the present disclosure. For example, the resource reclaim module 308 is configured to identify transmission opportunities in a shared spectrum, perform network listening, reserve time intervals for using the shared spectrum, and reclaiming unused resources, as described in greater detail herein.

As shown, the transceiver 310 may include the modem subsystem 312 and the RF unit 314. The transceiver 310 can be configured to communicate bi-directionally with other devices, such as the BSs 105 and 205. The modem subsystem 312 may be configured to modulate and/or encode the data from the memory 304 and/or the resource reclaim module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 215 or a BS 205. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 215 to enable the UE 215 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of clear-to-send (CTS) signals according to embodiments of the present disclosure. The antenna 316 may further receive data messages transmitted from other devices. This may include, for example, reception of request-to-send (RTS) and/or CTS signals according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316.

Figure 4:
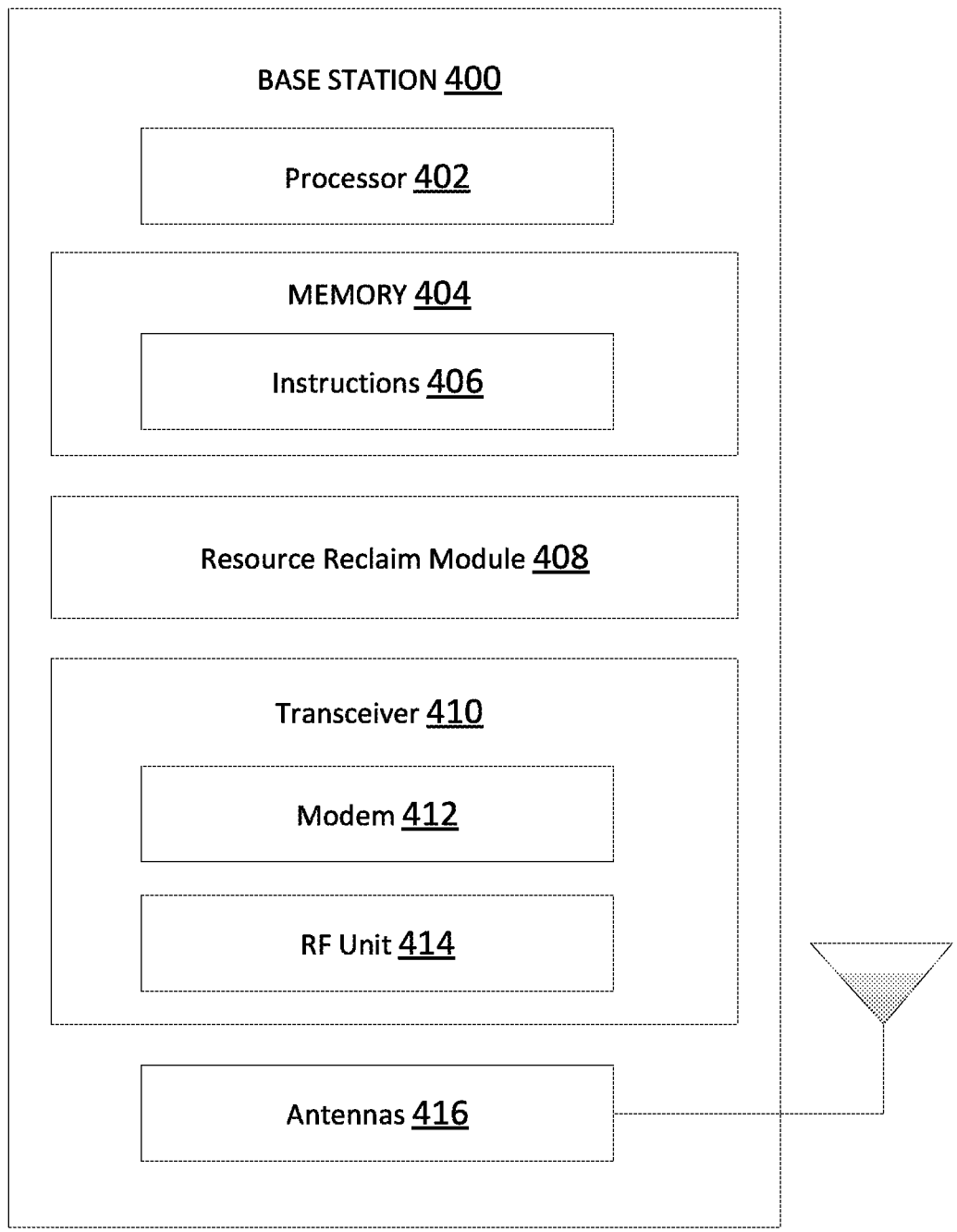
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above. A shown, the BS 400 may include a processor 402, a memory 404, a resource reclaim module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The resource reclaim module 408 may be used for various aspects of the present disclosure. For example, the resource reclaim module 408 may identify transmission opportunities in a shared spectrum, perform network listening, reserve time intervals for using the shared spectrum monitor, and reclaim unused resources, as described in greater detail herein.

As shown, the transceiver 410 may include the modem subsystem 412 and the RF unit 414. The transceiver 410 can be configured to communicate bi-directionally with other devices, such as the UEs 115 and 215 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 205 to enable the BS 205 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 215 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
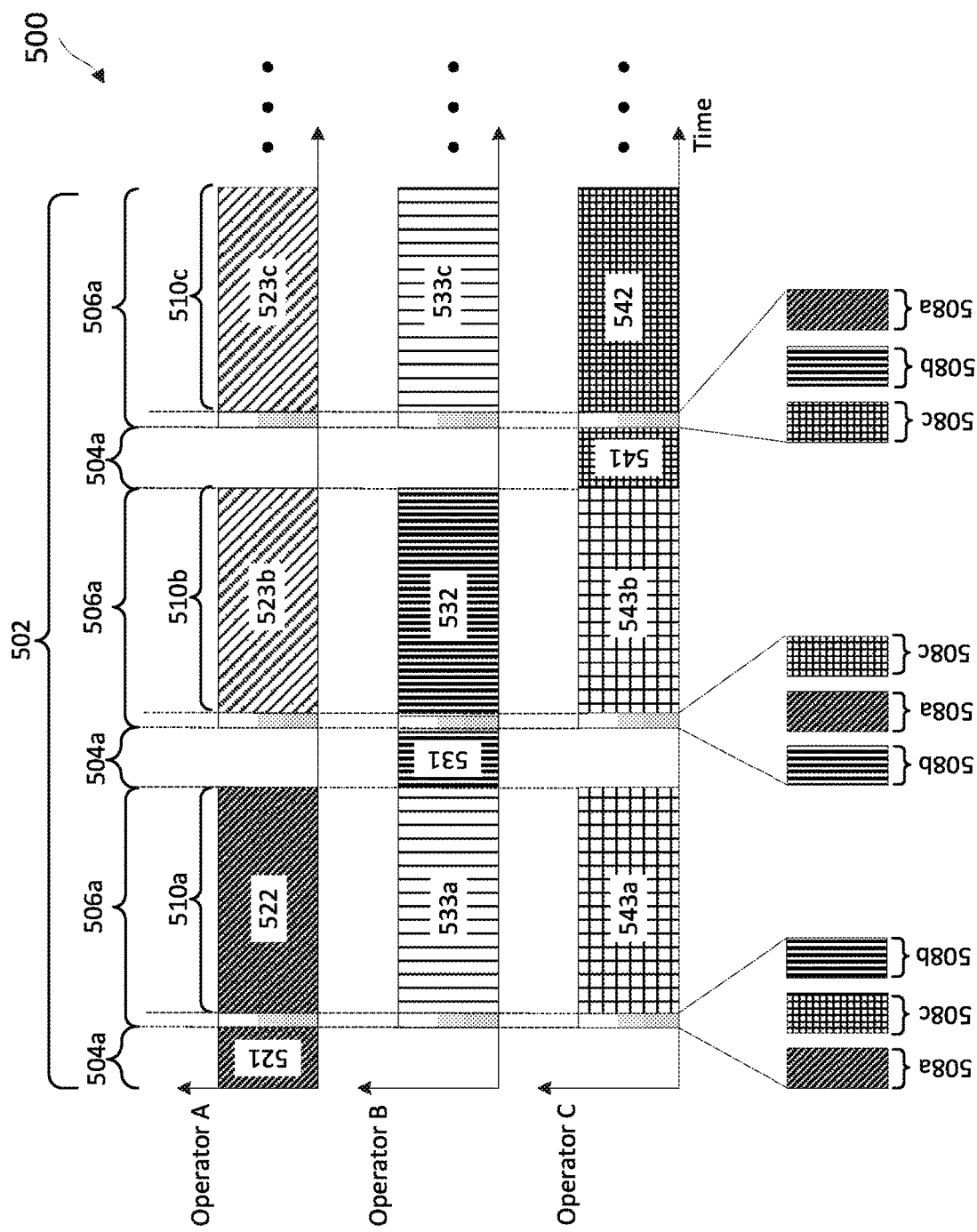
FIG. 5 is a timing diagram illustrating a coordinated SS scheme according to embodiments of the present disclosure.

FIG. 5 is a timing diagram illustrating a coordinated SS scheme 500 according to embodiments of the present disclosure. The x-axis represents time in some constant units. The scheme 500 may be employed by the BSs 105 and 205 and the UEs 115 and 215. While the scheme 500 illustrates coordinated spectrum access for three different network operating entities (e.g., Operator A, Operator B, and Operator C), the scheme 500 can be applied to any suitable number of network operating entities.

In the scheme 500, a shared spectrum is time-partitioned into superframes 502. Each superframe 502 is partitioned into exclusive access intervals 504 and transmit opportunity (TXOP) intervals 506. Each TXOP interval 506 includes a plurality of reservation indication slots 508 at the beginning of the TXOP interval 506, followed by a transmission slot 510. The exclusive access intervals 504, the reservation indication slots 508, and the transmission slot 510 may have fixed duration. For example, each exclusive access interval 504 may include one or more subframes, each reservation indication slot 508 may include one or more OFDM symbols, and each transmission slot 510 may include one or more subframes. The structure of the superframe 502 is pre-determined and known by all network operating entities sharing the shared spectrum. The network operating entities may be time-synchronized when operating in the shared spectrum.

Each exclusive access interval 504 is designated for exclusive use by a particular network operating entity. For example, the exclusive access interval 504a is designated for exclusive communication 521 by Operator A. Operators B and C are not allowed to transmit during the exclusive access interval 504a. Similarly, the exclusive access interval 504b is designated for exclusive communication 531 by Operator B, and the exclusive access interval 504c is designated for exclusive communication 541 by Operator C.

Each reservation indication slot 508 in a TXOP interval 506 is assigned to a particular network operating entity. For example, the reservation indication slots 508a, 508b, and 508c are assigned to Operators A, B, and C, respectively. The number of reservation indication slots 508 in a TXOP interval 506 may be dependent on the number of network operating entities in a network. For example, a network with N network operators may include up to N reservation indication slots 508 in a TXOP interval 506. The reservation indication slots 508 can be arranged in a TXOP interval 506 based on communication or access priorities of the network operating entities, for example, in a descending order. Thus, each TXOP interval 506 is prioritized for use by a highest priority network operating entity, and may be utilized by lower priority network operating entities on an opportunistic basis if the prioritized network operating entity does not utilize the resources. In addition, the priorities of the network operating entities may rotate (e.g., in a round-robin fashion) among the TXOP intervals 506 within a superframe 502.

As shown, the transmission slot 510a is designated for prioritized communication 522 by Operator A and opportunistic communications 533a and 543a by Operators B and C, respectively. The transmission slot 510b is designated for prioritized communication 532 by Operator B and opportunistic communications 523b and 543b by Operators A and C, respectively. The transmission slot 510c is designated for prioritized communication 542 by Operator C and opportunistic communications 523c and 533c by Operators A and B, respectively. Prioritized communication and opportunistic communication are described in greater detail below.

Figure 6:
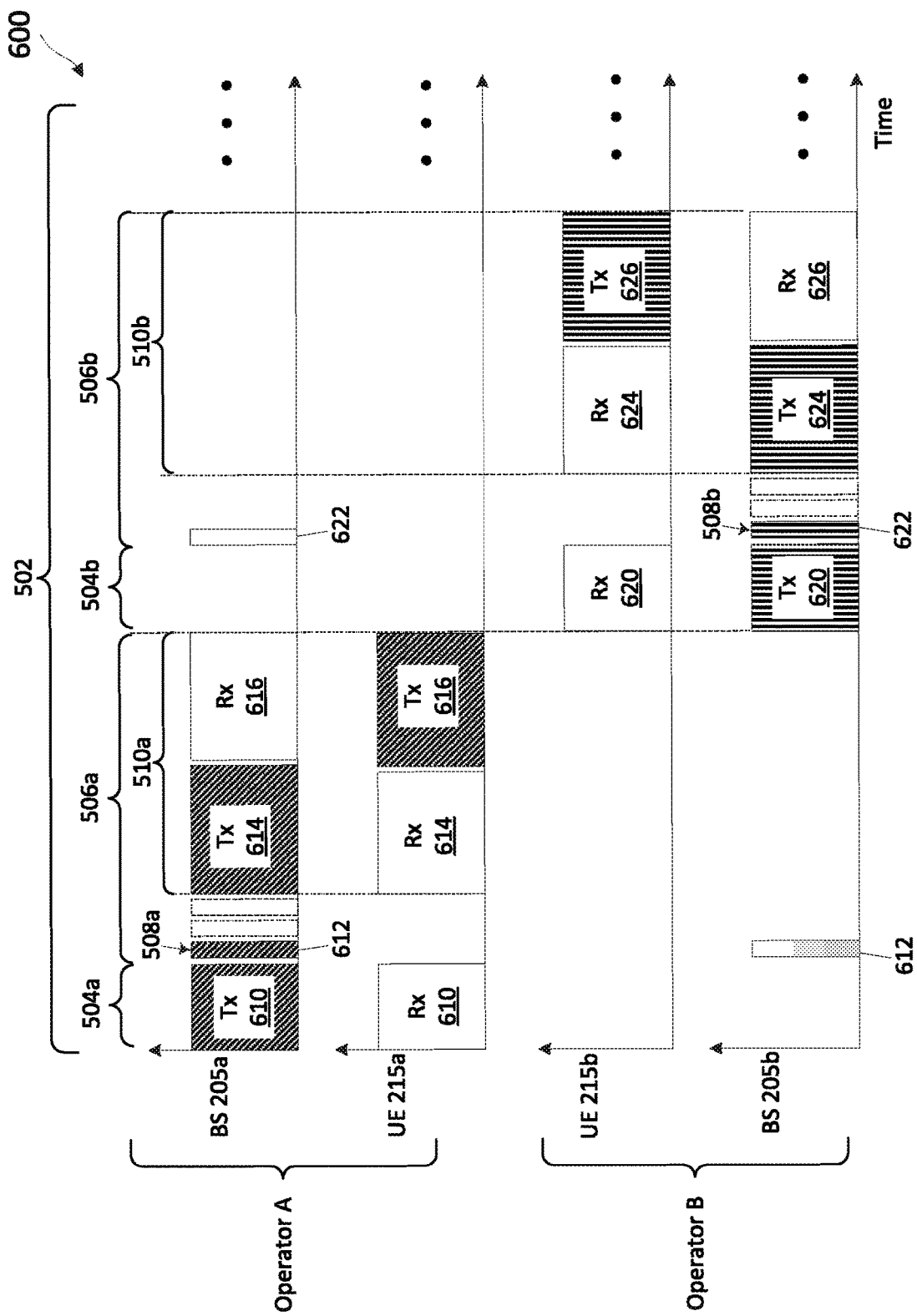
FIG. 6 is a timing diagram illustrating a priority access scenario according to embodiments of the present disclosure.
Figure 7:
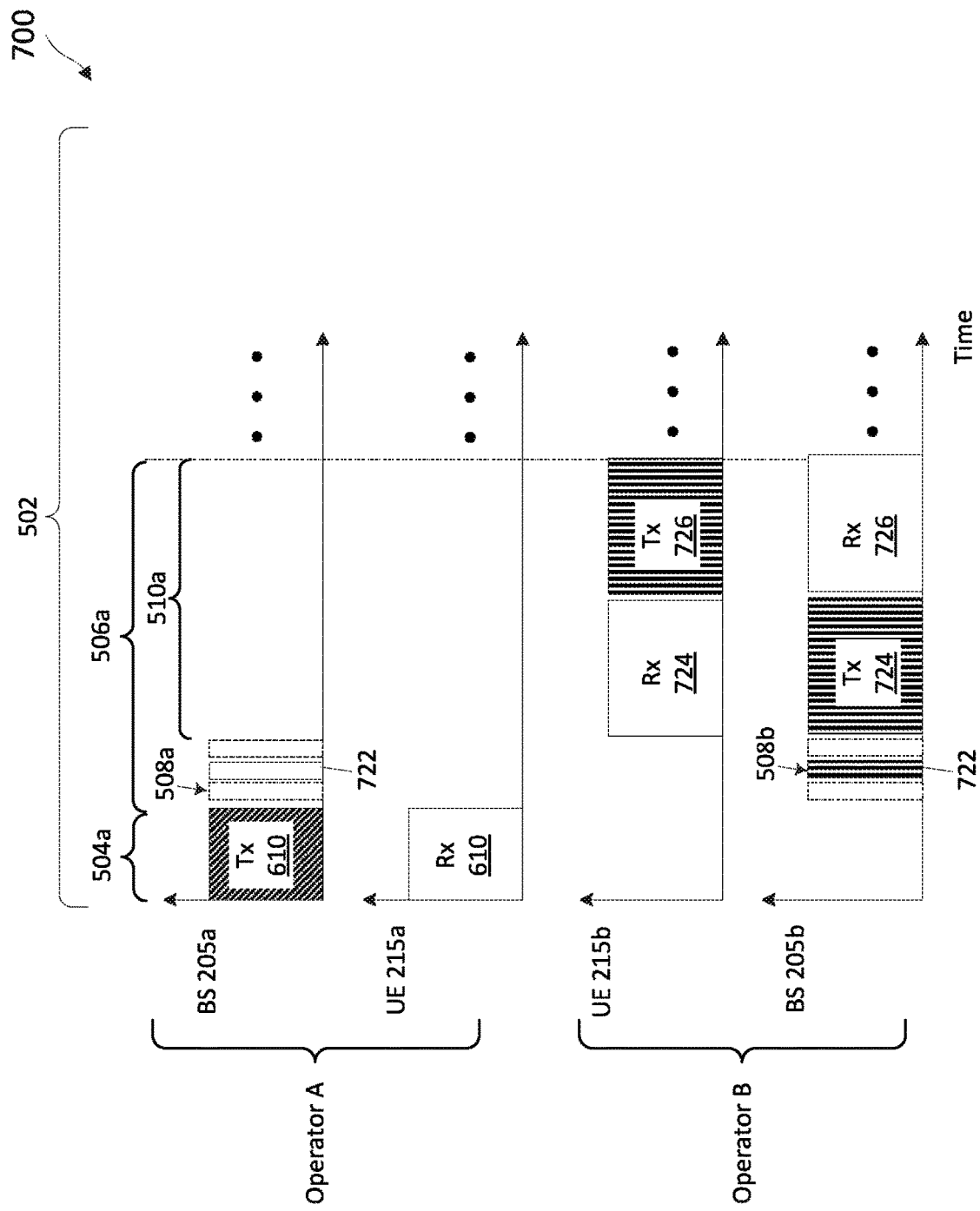
FIG. 7 is a timing diagram illustrating an opportunistic access scenario according to embodiments of the present disclosure.
Figure 8:
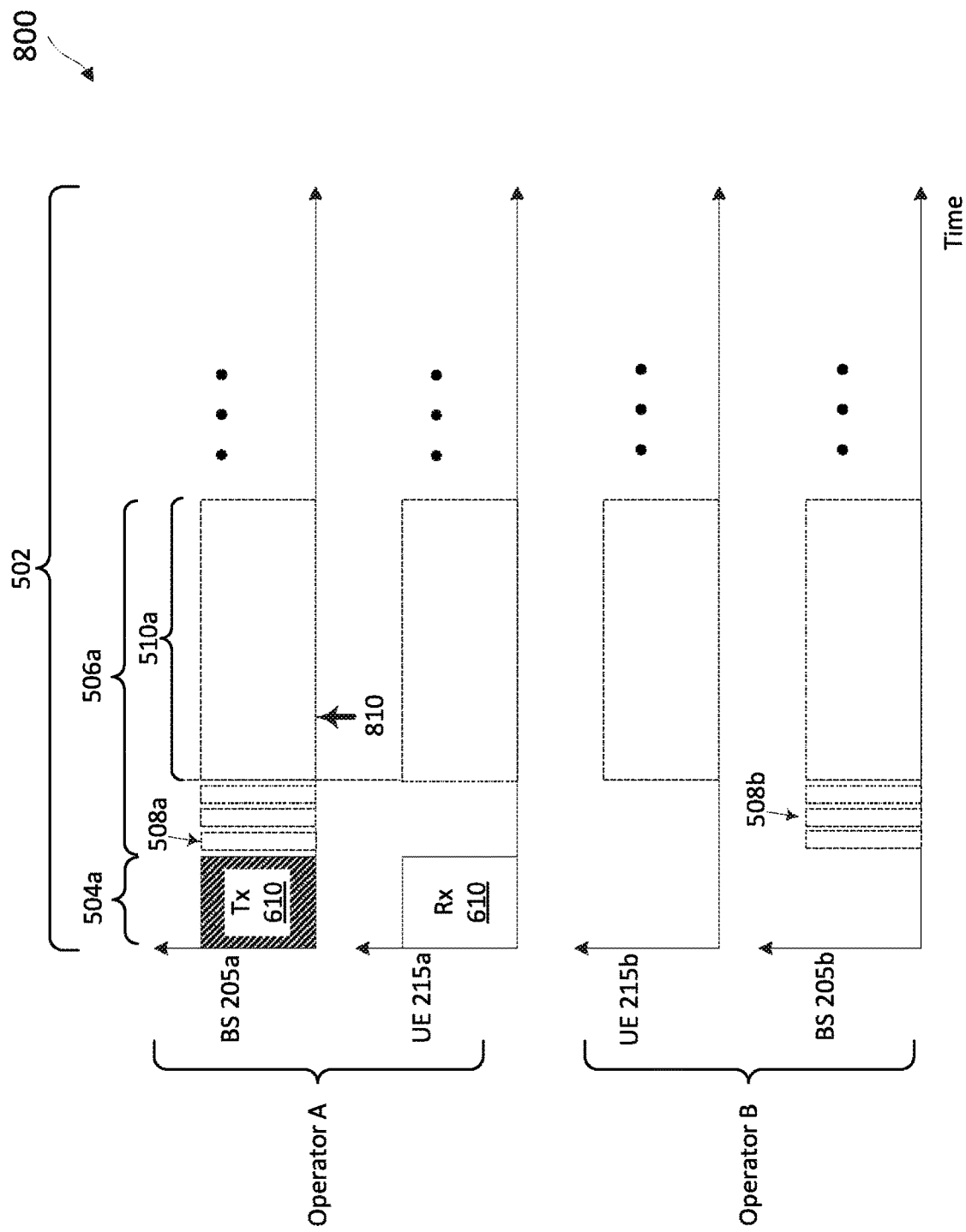
FIG. 8 is a timing diagram illustrating an unused transmission opportunity scenario according to embodiments of the present disclosure.

FIGS. 6-8 illustrate various coordinated access scenarios between Operator A and Operator B of the scheme 500. For example, Operator A operates the BS 205a and the UE 215a, and Operator B operates the BS 205b and the UE 215b. In FIGS. 6-8, the patterned boxes represent transmit (Tx) signals and the empty boxes represent receive (Rx) signals. The dashed boxes are included to show the transmission and/or reception with reference to the structure of the superframe 502 (e.g., without signal transmission or reception). While FIGS. 6-8 illustrate two network operating entities, the number of network operating entities may be greater than two. In addition, each network operating entity may include many more BSs 205 and UEs 215.

FIG. 6 is a timing diagram illustrating a prioritized communication scenario 600 according to embodiments of the present disclosure. In the scenario 600, the BS 205a communicates (e.g., a signal 610) with the UE 215a in the exclusive access interval 504a designated for Operator A. In addition, the BS 205a uses priority access in the TXOP interval 506a. The BS 205a transmits a reservation request signal 612 in the reservation indication slot 508a of the TXOP interval 506a and proceeds to exchange data (e.g., signals 614 and 616) with the UE 215a in the transmission slot 510a. Although not shown, the UE 215a can respond to the reservation request signal 612 by sending a reservation response signal in the reservation indication slot 508a. The reservation request signal 612 and the reservation response signal are pre-determined signals, for example, preamble sequences that are known to all network operating entities sharing the shared spectrum. In some embodiments, the reservation request signal 612 may be a CSI-RS and the reservation response signal may be a SRS. The BS 205b may monitor the channel in the TXOP interval 506a. Upon detection of the reservation request signal 612, the BS 205b refrains from communicating in the transmission slot 510a.

Similarly, the BS 205b communicates (e.g., a signal 620) with the UE 215b in the exclusive access interval 504b designated for Operator B. The BS 205b uses priority access in the TXOP interval 506b. The BS 205b transmits a reservation request signal 622 in the reservation indication slot 508b of the TXOP interval 506b and proceeds to exchange data (e.g., signals 624 and 626) with the UE 215b in the transmission slot 510b. The BS 205a may monitor the channel in the TXOP interval 506b. Upon detection of the reservation request signal 622, the BS 205a refrains from communicating in the transmission slot 510b.

FIG. 7 is a timing diagram illustrating an opportunistic access scenario 700 according to embodiments of the present disclosure. In the scenario 700, the BS 205a communicates with the UE 215a in the exclusive access interval 504a similar to the scenario 600. However, the BS 205a did not reserve the TXOP interval 506a for priority access, for example, due to no data ready for transmission, where no reservation request signal (e.g., the reservation request signal 612) is sent in the reservation indication slot 508a. The BS 205b monitors the channel during the reservation indication slot 508a and detected that there is no reservation from Operator A. Thus, the BS 205b of Operator B can opportunistically access the shared spectrum in the TXOP interval 506a. As shown, the BS 205b transmits a reservation request signal 722 in the reservation indication slot 508b and proceeds to exchange data (e.g., signals 724 and 726) with the UE 215b in the transmission slot 510b.

FIG. 8 is a timing diagram illustrating an unused transmission opportunity scenario 800 according to embodiments of the present disclosure. In the scenario 800, the BS 205a communicates with the UE 215a in the exclusive access interval 504a and did not reserve the TXOP interval 506 for priority access similar to the scenario 700. However, the BS 205b also did not reserve the TXOP interval 506 for opportunistic access, where no reservation request signal is transmitted in the reservation indication slot 508b. Thus, the resource (e.g., the shared spectrum) is available or unused in the transmission slot 510a. Subsequently, at a time 810 within the transmission slot 510a, the BS 205a has data ready for transmission. However, since the BS 205a did not send a reservation request signal in the reservation indication slot 508a, the BS 205a is not allowed to transmit in the transmission slot 510a and need to wait for a next TXOP interval 506. As such, the scheme 500 may not utilize the system capacity or bandwidth efficiently.

Figure 9:
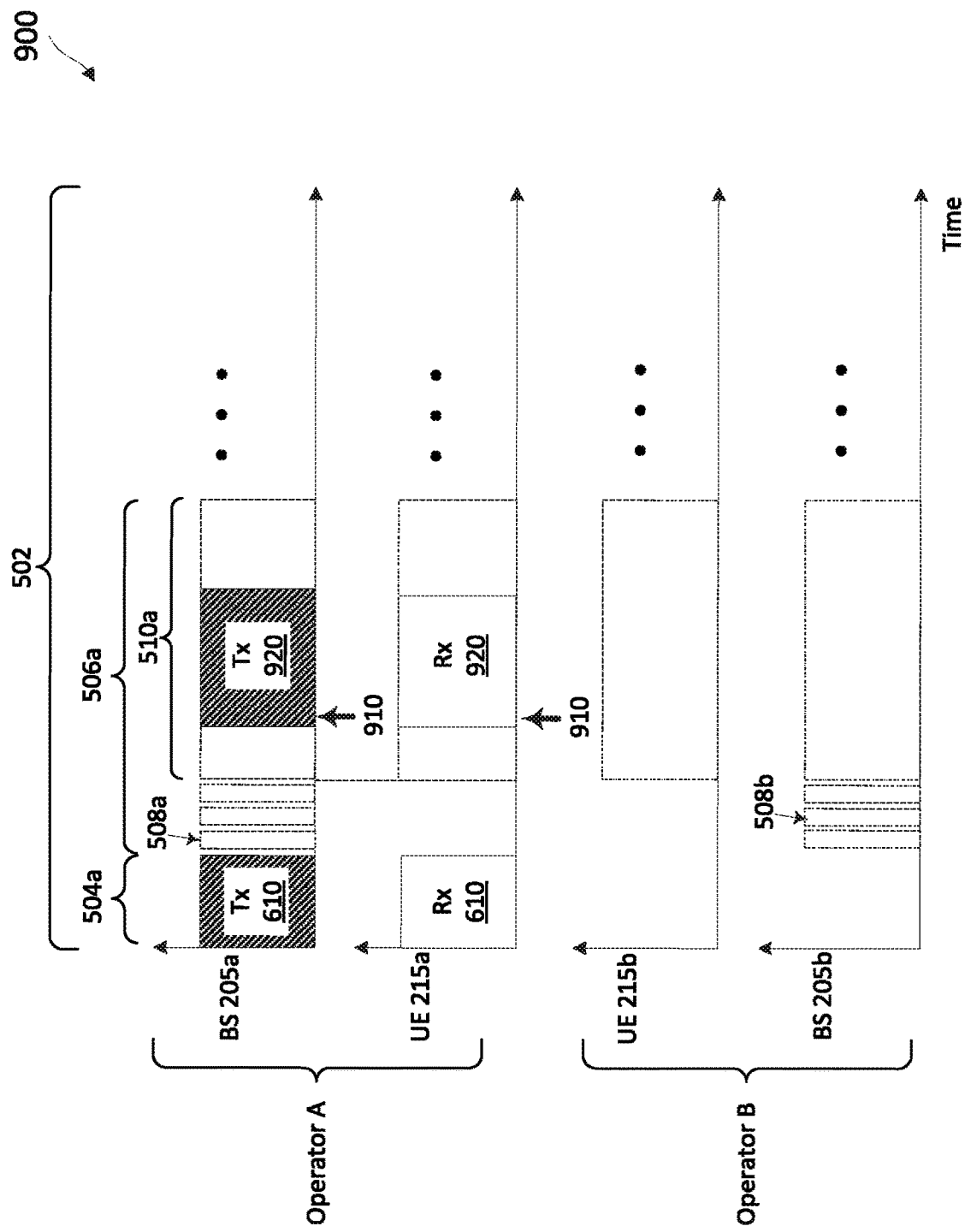
FIG. 9 is a timing diagram illustrating an opportunistic resource reclaiming scheme according to embodiments of the present disclosure.

FIG. 9 is a timing diagram illustrating an opportunistic resource reclaiming scheme 900 according to embodiments of the present disclosure. The scheme 900 may be employed by the networks 100 and 200. The scheme 900 may provision for exclusive communications, prioritized communications, and opportunistic communications for multiple network operating entities over a shared spectrum using a similar frame structure (e.g., the superframe 502) and mechanisms as in the scheme 500. However, the scheme 900 allows a prioritized operator node to reclaim a TXOP interval 506 without a prior reservation when there is no transmission from a lower priority operator node.

For example, the BS 205a did not send a reservation request signal in the reservation indication slot 508a to reserve the TXOP interval 506a. Similarly, the BS 205b also did not reserve the TXOP interval 506a. Thus, the BS 205b does not transmit a reservation request signal in the reservation indication slot 508b. Subsequently, at a time 910 within the transmission slot 510a, the BS 205a has data ready for transmission. For example, the BS 205a listens to the channel during reservation indication slots 508 of lower priorities and determines that there is no reservation for the transmission slot 510a from a lower priority operator node. Thus, the BS 205a may opportunistically reclaim the transmission slot 510a for transmission as shown by the signal 920. As such, the unused prioritized resource is reclaimed instead of unutilized as shown in the scenario 800. Thus, the scheme 900 is more efficient in bandwidth or system capacity utilization.

In addition to a potential low priority transmission, there may be an on-going high priority transmission (e.g., from another node of the same Operator A) in the transmission slot 510a. In one embodiment, the BS 205a may opportunistically reclaim the transmission slot 510a unconditionally (e.g., without listening to the channel) and rely on error correction schemes of the underlying communication protocol (e.g., hybrid automatic repeat request (HARQ)) to correct any error that may be caused by the collision and/or interference from the on-going high priority transmission. In another embodiment, the BS 205a may opportunistically reclaim the transmission slot 510a based on certain conditions. For example, the BS 205a may determine that an on-going high priority transmission has a signal strength that is less than a pre-determined threshold, and thus may cause limited interference (e.g., low interference) when the BS 205a transmits in the transmission slot 510a.

In another embodiment, the BS 205a may asynchronously or synchronously monitor for a high priority transmission from another BS of the same Operator A in the transmission slot 510a. For asynchronous monitoring, the BS 205a may determine whether there is a transmission in the transmission slot 510a based on signal energy detection or packet detection. The signal energy detection or packet detection may be performed at an OFDM symbol boundary. In some embodiments, the BS 205a may transmit a reservation request signal (e.g., a RTS signal) similar to the reservation request signals 612, 622, and 722 and the UE 215a may respond with a reservation response signal (e.g., a CTS signal or a SRS) before the transmission of the signal 920. In such embodiments, a BS may monitor for a transmission based on RTS and/or CTS detections. Alternatively, for synchronous monitoring, the transmission slot 510a may be further partitioned into multiple intervals similar to the TXOP interval 506a as shown in FIG. 10.

Figure 10:
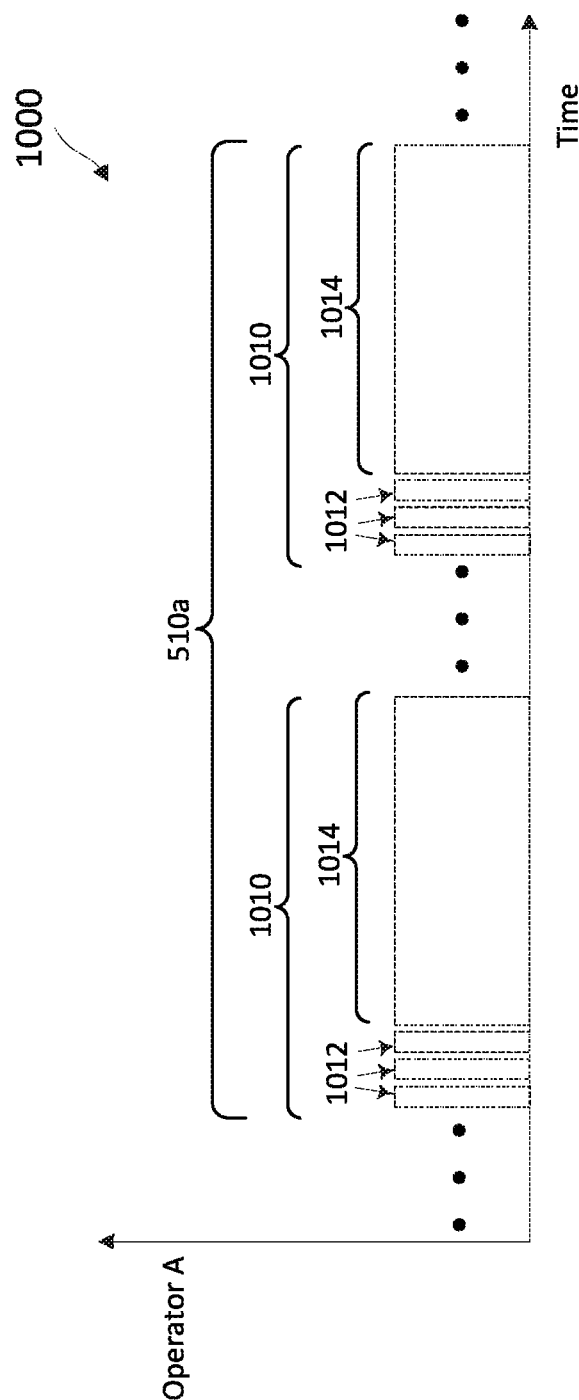
FIG. 10 is a timing diagram illustrating an unused transmission opportunity scenario according to embodiments of the present disclosure.

FIG. 10 is a timing diagram illustrating an intra-operator coordinated access scheme 1000 according to embodiments of the present disclosure. The scheme 1000 refines the partitioning of the transmission slot 510a. As shown, the transmission slot 510a includes multiple sub-intervals 1010 similar to the TXOP intervals 506. Each sub-interval 1010 includes a plurality of reservation indication slots 1012 and a transmission slot 1014. The reservation indication slots 1012 are similar to the reservation indication slots 508, but each reservation indication slot 1012 is assigned to a particular subset of BSs of Operator A instead of different operators and may be prioritized. For example, the reservation indication slots 1012 are assigned based on power classes of the BSs and UEs. The BSs of Operator A may reserve and access the transmission slot 1014 using similar mechanisms described above in the scenarios 600 and 700 for coordinated access in the shared spectrum.

Figure 11:
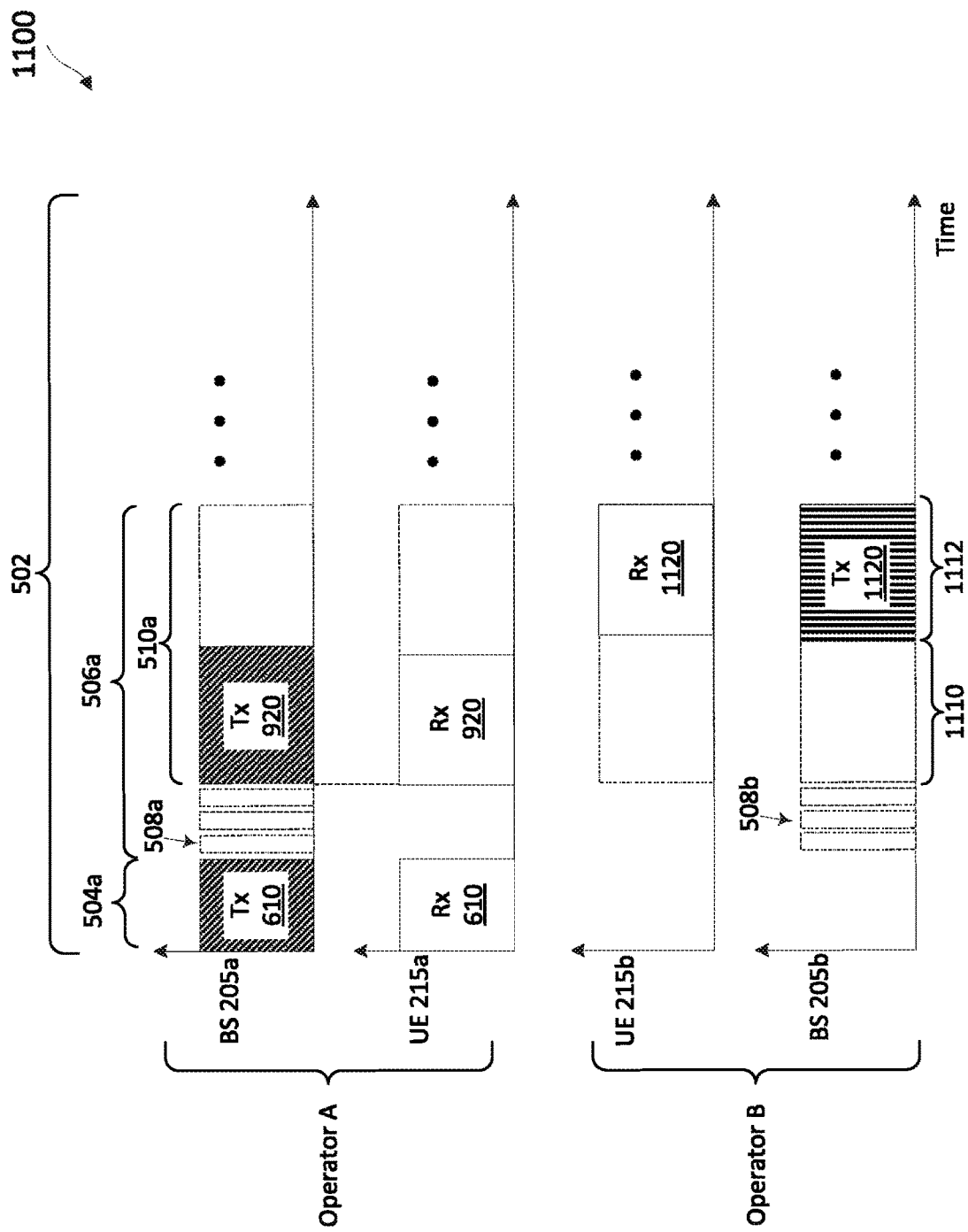
FIG. 11 is a timing diagram illustrating an opportunistic resource reclaiming scheme according to embodiments of the present disclosure.

FIG. 11 is a timing diagram illustrating an opportunistic resource reclaiming scheme 1100 according to embodiments of the present disclosure. The scheme 1100 is similar to the scheme 900. But, the scheme 1100 further improves resource utilization efficiency. For example, the BS 205a communicates (e.g., the signal 920) with the UE 215a in a portion 1110 of the transmission slot 510a. The scheme 1100 allows a lower priority operator node (e.g., the BS 205b and the UE 215b) to transmit in a remaining portion 1112 of the transmission slot 510a. As shown, the BS 205b communicates (e.g., a signal 1120) with the UE 215b in the remaining portion 1112 of the transmission slot 510a.

In one embodiment, the scheme 1100 only allows a second highest priority operator node to use the remaining portion 1112 for communication. For example, Operator A, B, and C have decreasing priorities in the transmission slot 510a, Operator B can use the remaining portion 1112 for communication, but not Operator C. In order to avoid collision in the transmission slot 510a, the BS 205b (e.g., the lower priority operator node) may monitor the channel for transmissions from Operator A nodes (e.g., the BS 205a and UE 215a). For example, the BS may perform energy detection, where a signification drop in signal energy may indicate the completion of a transmission.

In other embodiments, the scheme 1100 may further partition the transmission slot 510a into multiple sub-intervals similar to the scheme 1000 and allow different priority operator nodes to transmit in different portions of the remaining portion 1112. For example, the remaining portion 1112 has two sub-intervals, one sub-interval designated for opportunistic reclaiming by Operator B and another sub-interval designated for opportunistic reclaiming by Operator C. In such embodiments, the BS 205b may monitor for reservation request signal and/or reservation response signal in the transmission slot 510a. Although the scheme 1100 is illustrates with no reservation from the BS 205a in the reservation indication slot 508a for the TXOP interval 506a, the scheme 1100 may also apply when the BS 205a transmits a reservation request signal (e.g., the reservation request signal 612) in the reservation indication slot 508a.

Although the scheme 1100 is described in the context of a lower priority operator node reclaiming a remaining portion of a transmission slot after a higher priority operator node has completed its transmission. The scheme 1100 may also be used by a high priority operator node to reclaim a remaining portion of a transmission slot after a low priority operator node has completed its transmission.

In the schemes 500, 900, 1000, and 1100, the configurations for the superframe 502, the TXOP intervals 506, the reservation indication slots 508 and 1012, the transmission slots 510 and 1014 may be semi-statically configured by a central authority, for example, a particular BS or an entity in the core network 130. The BSs may dynamically schedule resources within negotiated transmission slots 510 and 1014. A network may employ any combination of the schemes 500, 900, 1000, and 1100 for coordinated SS among multiple network operating entities.

Figure 12:
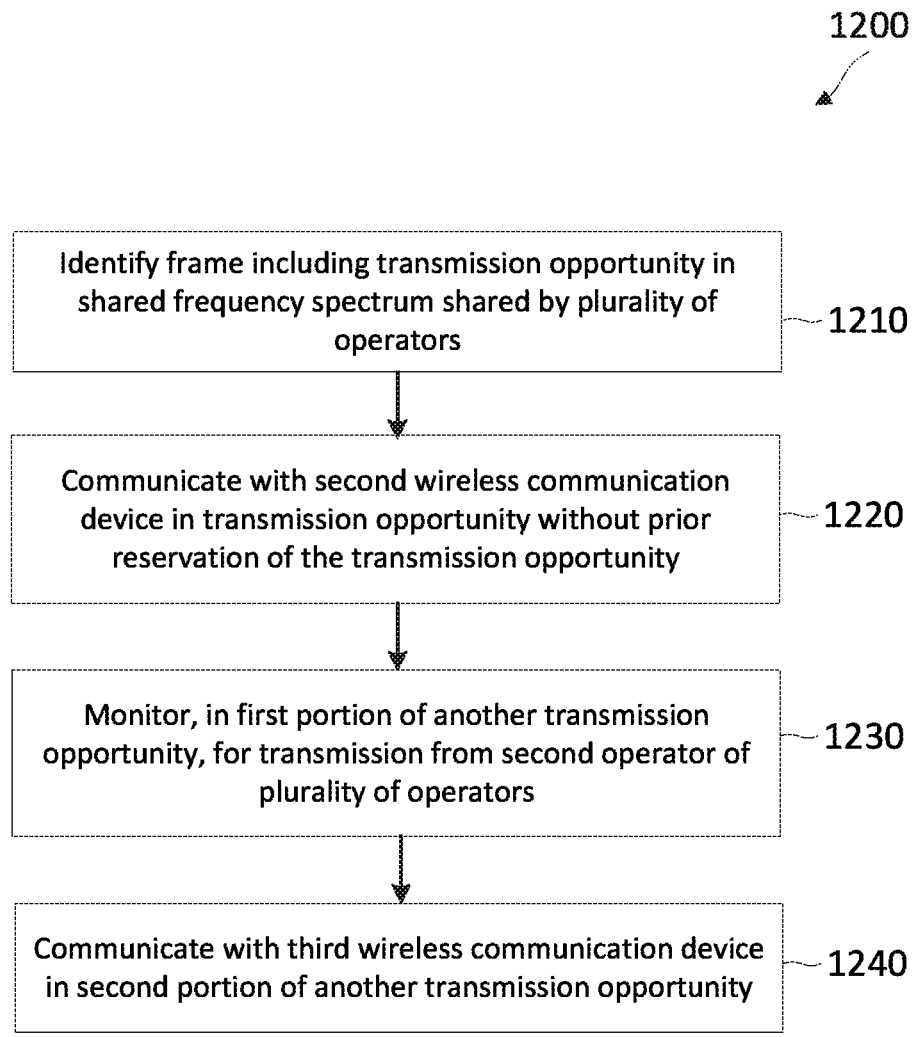
FIG. 12 is a flow diagram of a method of performing SS with opportunistic resource reclaiming according to embodiments of the present disclosure.

FIG. 12 is a flow diagram of a method 1200 of performing SS with opportunistic resource reclaiming according to embodiments of the present disclosure. Steps of the method 1200 can be executed by a computing device (e.g., a processor, processing circuit, and/or other suitable component) of a wireless communication device, such as the BSs 105, 205, and 400 and the UEs 115, 215, and 300. The method 1200 may employ similar mechanisms as in the schemes 500, 900, 1000, and 1100 described with respect to FIGS. 5, 9, 10, and 11, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes identifying a transmission opportunity (e.g., the transmission slot 510a of the TXOP interval 506a) in a shared frequency spectrum shared by a plurality of operators (e.g., Operators A and B). For example, the wireless communication device (e.g., the BS 205a) is associated with a first operator (e.g., Operator A) of the plurality of operators. The first operator has priority among the plurality of operators for accessing the shared frequency spectrum in the transmission opportunity.

At step 1220, the method 1200 includes communicating with a second wireless communication device (e.g., the UE 215a) associated with the first operator, in the transmission opportunity without transmitting a prior reservation of the transmission opportunity. For example, the wireless communication device did not transmit a reservation request signal (e.g., the reservation request signal 612) to reserve the transmission opportunity (e.g., as shown in the scheme 900).

At step 1230, the method 1200 includes monitoring, in a first portion of another transmission opportunity for a transmission from a second operator (e.g., Operator B). For example, the another transmission opportunity is designated for prioritized used by the second operator.

At step 1240, the method 1200 includes communicating with a third wireless communication device associated with the first operator based on the monitoring in a second portion of the another transmission opportunity (e.g., as shown in the scheme 1100).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication including identifying, by a first wireless communication device associated with a first operator of a plurality of operators, a transmission opportunity in a shared frequency spectrum shared by the plurality of operators, wherein the first operator has priority among the plurality of operators for accessing the shared frequency spectrum in the transmission opportunity; and communicating, by the first wireless communication device, with a second wireless communication device associated with the first operator, in the transmission opportunity without a prior reservation of the transmission opportunity.

In some embodiments, the method further comprises determining, by the first wireless communication device, that the transmission opportunity is reclaimable for the communicating by monitoring for a reservation for the transmission opportunity from a lower priority operator; and determining that the transmission opportunity is not reserved by the lower priority operator based on the monitoring. In some embodiments, the method further comprises determining, by the first wireless communication device, that the transmission opportunity is reclaimable for the communicating by monitoring for a transmission in the transmission opportunity; and determining that there is no transmission in the transmission opportunity based on the monitoring. In some embodiments, the method further comprises determining, by the first wireless communication device, that the transmission opportunity is reclaimable for the communicating by detecting a transmission from a third wireless communication device associated with the first operator in the transmission opportunity; and determining that the transmission from the third wireless communication device has a signal strength that is less than a predetermined threshold. In some embodiments, the method further comprises determining, by the first wireless communication device, that the transmission opportunity is reclaimable for the communicating by detecting that a transmission from a third wireless communication device associated with the first operator in a first portion of the transmission opportunity has completed, wherein the communicating with the second wireless communication device is in a second portion of the transmission opportunity following the first portion. In some embodiments, the detecting is based on at least one of a signal energy detection or a packet detection. In some embodiments, the communicating with the second wireless communication device includes transmitting, in a third portion of the transmission opportunity, a reservation request signal to reserve the shared frequency spectrum in the second portion of the transmission opportunity. In some embodiments, the communicating with the second wireless communication device further includes receiving, from the second wireless communication device in the third portion of the transmission opportunity, a reservation response signal in response to the reservation request signal. In some embodiments, the third portion of the transmission opportunity is designated for a reservation signal transmission from a subset of wireless communication devices of the first operator including the first wireless communication device. In some embodiments, the method further comprises detecting, by the first wireless communication device in a first portion of another transmission opportunity, that a transmission from a second operator of the plurality of operators has completed, wherein the second operator has a higher priority than the first operator for accessing the shared frequency spectrum in the another transmission opportunity; and communicating, by the first wireless communication device, with a third wireless communication device associated with the first operator in a second portion of the another transmission opportunity following the first portion. In some embodiments, the first operator has a second highest priority among the plurality of operators for accessing the shared frequency spectrum in the another transmission opportunity.

Further embodiments of the present disclosure include an apparatus comprising a processor configured to identify a transmission opportunity in a shared frequency spectrum shared by a plurality of operators, wherein the apparatus is associated with a first operator of a plurality of operators, and wherein the first operator has priority among the plurality of operators for accessing the shared frequency spectrum in the transmission opportunity; and a transceiver configured to communicate with a second wireless communication device associated with the first operator, in the transmission opportunity without a prior reservation of the transmission opportunity.

In some embodiments, the processor is further configured to determine that the transmission opportunity is reclaimable for the communicating by monitoring for a reservation for the transmission opportunity from a lower priority operator; and determining that the transmission opportunity is not reserved by the lower priority operator based on the monitoring. In some embodiments, the processor is further configured to determine that the transmission opportunity is reclaimable for the communicating by monitoring for a transmission in the transmission opportunity; and determining that there is no transmission in the transmission opportunity based on the monitoring. In some embodiments, the processor is further configured to determine that the transmission opportunity is reclaimable for the communicating by detecting a transmission from a third wireless communication device associated with the first operator in the transmission opportunity; and determining that the transmission from the third wireless communication device has a signal strength that is less than a predetermined threshold. In some embodiments, the processor is further configured to determine that the transmission opportunity is reclaimable for the communicating by detecting that a transmission from a third wireless communication device associated with the first operator in a first portion of the transmission opportunity has completed, and wherein the communicating with the second wireless communication device is in a second portion of the transmission opportunity following the first portion. In some embodiments, the processor is further configured to detect that the transmission from the third wireless communication device associated with the first operator in the first portion of the transmission opportunity has completed based on at least one of a signal energy detection or a packet detection. In some embodiments, the transceiver is further configured to communicate with the second wireless communication device by transmitting, in a third portion of the transmission opportunity, a reservation request signal to reserve the shared frequency spectrum in the second portion of the transmission opportunity. In some embodiments, the transceiver is further configured to communicate with the second wireless communication device by receiving, from the second wireless communication device in the third portion of the transmission opportunity, a reservation response signal in response to the reservation request signal. In some embodiments, the third portion of the transmission opportunity is designated for a reservation signal transmission from a subset of wireless communication devices of the first operator including the apparatus. In some embodiments, the processor is further configured to detect, in a first portion of another transmission opportunity, that a transmission from a second operator of the plurality of operators has completed, wherein the second operator has a higher priority than the first operator for accessing the shared frequency spectrum in the another transmission opportunity, and wherein the transceiver is further configured to communicate with a third wireless communication device associated with the first operator in a second portion of the another transmission opportunity following the first portion. In some embodiments, the first operator has a second highest priority among the plurality of operators for accessing the shared frequency spectrum in the another transmission opportunity.

Further embodiments of the present disclosure include a computer-readable medium having program code recorded thereon, the program code comprising code for causing a first wireless communication device associated with a first operator of a plurality of operators to identify a transmission opportunity in a shared frequency spectrum shared by the plurality of operators, wherein the first operator has priority among the plurality of operators for accessing the shared frequency spectrum in the transmission opportunity; and code for causing the first wireless communication device to communicate with a second wireless communication device associated with the first operator, in the transmission opportunity without a prior reservation of the transmission opportunity.

In some embodiments, the computer-readable medium further comprises code for causing the first wireless communication device to determine that the transmission opportunity is reclaimable for the communicating by monitoring for a reservation for the transmission opportunity from a lower priority operator; and determining that the transmission opportunity is not reserved by the lower priority operator based on the monitoring. In some embodiments, the computer-readable medium further comprises code for causing the first wireless communication device to determine that the transmission opportunity is reclaimable for the communicating by monitoring for a transmission in the transmission opportunity; and determining that there is no transmission in the transmission opportunity based on the monitoring. In some embodiments, the computer-readable medium of claim 23, further comprising code for causing the first wireless communication device to determine that the transmission opportunity is reclaimable for the communicating by detecting a transmission from a third wireless communication device associated with the first operator in the transmission opportunity; and determining that the transmission from the third wireless communication device has a signal strength that is less than a predetermined threshold. In some embodiments, the computer-readable medium further comprises code for causing the first wireless communication device to determine that the transmission opportunity is reclaimable for the communicating by detecting that a transmission from a third wireless communication device associated with the first operator in a first portion of the transmission opportunity has completed, wherein the communicating with the second wireless communication device is in a second portion of the transmission opportunity following the first portion. In some embodiments, the detecting is based on at least one of a signal energy detection or a packet detection. In some embodiments, the code for communicating with the second wireless communication device is further configured to transmit, in a third portion of the transmission opportunity, a reservation request signal to reserve the shared frequency spectrum in the second portion of the transmission opportunity. In some embodiments, the code for communicating with the second wireless communication device is further configured to receive, from the second wireless communication device in the third portion of the transmission opportunity, a reservation response signal in response to the reservation request signal. In some embodiments, the third portion of the transmission opportunity is designated for a reservation signal transmission from a subset of wireless communication devices of the first operator including the first wireless communication device. In some embodiments, the computer-readable medium of claim 23, further comprising code for causing the first wireless communication device to detect, in a first portion of another transmission opportunity, that a transmission from a second operator of the plurality of operators has completed, wherein the second operator has a higher priority than the first operator for accessing the shared frequency spectrum in the another transmission opportunity; and code for causing the first wireless communication device to communicate with a third wireless communication device associated with the first operator in a second portion of the another transmission opportunity following the first portion. In some embodiments, the first operator has a second highest priority among the plurality of operators for accessing the shared frequency spectrum in the another transmission opportunity.

Further embodiments of the present disclosure include an apparatus comprising means for identifying a transmission opportunity in a shared frequency spectrum shared by a plurality of operators, wherein the apparatus is associated with a first operator of a plurality of operators, wherein the first operator has priority among the plurality of operators for accessing the shared frequency spectrum in the transmission opportunity; and means for communicating with a second wireless communication device associated with the first operator, in the transmission opportunity without a prior reservation of the transmission opportunity.

In some embodiments, the apparatus further comprises means for determining that the transmission opportunity is reclaimable for the communicating by monitoring for a reservation for the transmission opportunity from a lower priority operator; and determining that the transmission opportunity is not reserved by the lower priority operator based on the monitoring. In some embodiments, the apparatus further comprises means for determining that the transmission opportunity is reclaimable for the communicating by monitoring for a transmission in the transmission opportunity; and determining that there is no transmission in the transmission opportunity based on the monitoring. In some embodiments, the apparatus of claim 34, further comprising means for determining that the transmission opportunity is reclaimable for the communicating by detecting a transmission from a third wireless communication device associated with the first operator in the transmission opportunity; and determining that the transmission from the third wireless communication device has a signal strength that is less than a predetermined threshold. In some embodiments, the apparatus further comprises means for determining that the transmission opportunity is reclaimable for the communicating by detecting that a transmission from a third wireless communication device associated with the first operator in a first portion of the transmission opportunity has completed, wherein the communicating with the second wireless communication device is in a second portion of the transmission opportunity following the first portion. In some embodiments, the detecting is based on at least one of a signal energy detection or a packet detection. In some embodiments, the means for communicating with the second wireless communication device is further configured to transmit, in a third portion of the transmission opportunity, a reservation request signal to reserve the shared frequency spectrum in the second portion of the transmission opportunity. In some embodiments, the means for communicating with the second wireless communication device is further configured to receive, from the second wireless communication device in the third portion of the transmission opportunity, a reservation response signal in response to the reservation request signal. In some embodiments, the third portion of the transmission opportunity is designated for a reservation signal transmission from a subset of wireless communication devices of the first operator including the apparatus. In some embodiments, the apparatus of claim 34, further comprising means for detecting, in a first portion of another transmission opportunity, that a transmission from a second operator of the plurality of operators has completed, wherein the second operator has a higher priority than the first operator for accessing the shared frequency spectrum in the another transmission opportunity; and means for communicating with a third wireless communication device associated with the first operator in a second portion of the another transmission opportunity following the first portion. In some embodiments, the first operator has a second highest priority among the plurality of operators for accessing the shared frequency spectrum in the another transmission opportunity.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
identifying, by a first wireless communication device associated with a first operator of a plurality of operators, a transmission opportunity in a shared frequency spectrum shared by the plurality of operators, wherein the transmission opportunity is not reserved by the first wireless communication device during a reservation indication slot of the transmission opportunity;
determining, by the first wireless communication device, that the transmission opportunity is reclaimable after the reservation indication slot; and
communicating, by the first wireless communication device, with a second wireless communication device associated with the first operator, in a reclaimed portion of the transmission opportunity without a reservation of the transmission opportunity by the first wireless communication device.

2. The method of claim 1, wherein the determining comprises detecting that a transmission from a third wireless communication device in a first portion of the transmission opportunity has completed, and wherein the reclaimed portion is after the first portion.

3. The method of claim 2, wherein the third wireless communication device is associated with the first operator.

4. The method of claim 2, wherein the third wireless communication device is associated with a second operator of the plurality of operators different from the first operator.

5. The method of claim 4, wherein the first operator has priority over the second operator for accessing the shared frequency spectrum in the transmission opportunity.

6. The method of claim 4, wherein the second operator has priority over the first operator for accessing the shared frequency spectrum in the transmission opportunity.

7. The method of claim 1, further comprising:
determining, by the first wireless communication device, that data is ready for transmission after the reservation indication slot,
wherein the communicating includes communicating, with the second wireless communication device, the data in the reclaimed portion of the transmission opportunity.

8. An apparatus comprising:
a processor configured to:
identify a transmission opportunity in a shared frequency spectrum shared by a plurality of operators, wherein the apparatus is associated with a first operator of the plurality of operators, and wherein the transmission opportunity is not reserved by the apparatus during a reservation indication slot of the transmission opportunity;
determine that the transmission opportunity is reclaimable after the reservation indication slot; and
a transceiver configured to communicate, with a second wireless communication device associated with the first operator, in a reclaimed portion of the transmission opportunity without a reservation of the transmission opportunity by the apparatus.

9. The apparatus of claim 8, wherein the processor configured to determine that the transmission opportunity is reclaimable is further configured to:
detect that a transmission from a third wireless communication device in a first portion of the transmission opportunity has completed, wherein the reclaimed portion is after the first portion.

10. The apparatus of claim 9, wherein the third wireless communication device is associated with the first operator.

11. The apparatus of claim 9, wherein the third wireless communication device is associated with a second operator of the plurality of operators different from the first operator.

12. The apparatus of claim 11, wherein the first operator has priority over the second operator for accessing the shared frequency spectrum in the transmission opportunity.

13. The apparatus of claim 11, wherein the second operator has priority over the first operator for accessing the shared frequency spectrum in the transmission opportunity.

14. The apparatus of claim 8, wherein the processor is further configured to:
determine that data is ready for transmission after the reservation indication slot, and
wherein the transceiver configured to communicate with the second wireless communication device is further configured to:
communicate, with the second wireless communication device, the data in the reclaimed portion of the transmission opportunity.

15. A non-transitory computer-readable medium having program code recorded thereon, the program code comprising:
code for causing a first wireless communication device associated with a first operator of a plurality of operators to identify a transmission opportunity in a shared frequency spectrum shared by the plurality of operators, wherein the transmission opportunity is not reserved by the first wireless communication device during a reservation indication slot of the transmission opportunity;
code for causing the first wireless communication device to determine that the transmission opportunity is reclaimable after the reservation indication slot; and
code for causing the first wireless communication device to communicate, with a second wireless communication device associated with the first operator, in a reclaimed portion of the transmission opportunity without a reservation of the transmission opportunity by the first wireless communication device.

16. The non-transitory computer-readable medium of claim 15, wherein the code for causing the first wireless communication device to determine that the transmission opportunity is reclaimable is further configured to:
detect that a transmission from a third wireless communication device in a first portion of the transmission opportunity has completed, wherein the reclaimed portion is after the first portion.

17. The non-transitory computer-readable medium of claim 16, wherein the third wireless communication device is associated with the first operator.

18. The non-transitory computer-readable medium of claim 16, wherein the third wireless communication device is associated with a second operator of the plurality of operators different from the first operator.

19. The non-transitory computer-readable medium of claim 18, wherein the first operator has priority over the second operator for accessing the shared frequency spectrum in the transmission opportunity.

20. The non-transitory computer-readable medium of claim 18, wherein the second operator has priority over the first operator for accessing the shared frequency spectrum in the transmission opportunity.

\* \* \* \* \*